(12) United States Patent
Kimura et al.

(10) Patent No.: US 10,246,052 B2
(45) Date of Patent: Apr. 2, 2019

(54) STEERING LOCK DEVICE AND ASSEMBLING METHOD OF STEERING LOCK DEVICE

(71) Applicant: KABUSHIKI KAISHA TOKAI RIKA DENKI SEISAKUSHO, Aichi (JP)

(72) Inventors: Tomonori Kimura, Aichi (JP); Takumi Tamezane, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 58 days.

(21) Appl. No.: 15/390,746

(22) Filed: Dec. 27, 2016

(65) Prior Publication Data

US 2017/0203717 A1 Jul. 20, 2017

(30) Foreign Application Priority Data

Jan. 14, 2016 (JP) .................................. 2016-005120

(51) Int. Cl.
*B60R 25/021* (2013.01)

(52) U.S. Cl.
CPC .. *B60R 25/02105* (2013.01); *B60R 25/02126* (2013.01)

(58) Field of Classification Search
CPC ........ B60R 25/02105; B60R 25/02126; B60R 25/02128
USPC ........................................... 70/182–186, 252
See application file for complete search history.

(56) References Cited

U.S. PATENT DOCUMENTS

| 3,442,102 A | * | 5/1969 | Butts | ................. | B60R 25/02126 70/1.5 |
| 3,590,611 A | * | 7/1971 | Nakashima | ....... | B60R 25/02128 70/186 |
| 3,940,958 A | * | 3/1976 | Kuroki | .............. | B60R 25/02126 70/186 |
| 4,759,203 A | * | 7/1988 | Lieb | .................. | B60R 25/02142 70/185 |

(Continued)

FOREIGN PATENT DOCUMENTS

| EP | 1600343 A1 | 11/2005 |
| GB | 2521900 A | 7/2015 |

(Continued)

OTHER PUBLICATIONS

Extended European Search Report dated Jun. 9, 2017 issued in European Patent application No. :16206980.1.

(Continued)

*Primary Examiner* — Lloyd A Gall

(57) ABSTRACT

A steering lock device for use with a steering shaft includes a lock bar, a camshaft, and a counterweight. The lock bar is moved between an engagement position where the lock bar is engaged with the steering shaft and a non-engagement position where the lock bar is disengaged from the steering shaft. The camshaft is rotated in response to a locking operation and an unlocking operation. The camshaft includes a lock actuation cam that moves the lock bar to the engagement position in a locking direction, and rotation of the steering shaft is prohibited when the lock bar is engaged with the steering shaft. The counterweight is arranged on the camshaft to adjust rotational balance of the camshaft.

4 Claims, 5 Drawing Sheets

(56) References Cited

U.S. PATENT DOCUMENTS

| | | | | |
|---|---|---|---|---|
| 4,884,423 | A * | 12/1989 | Fancher | B60R 25/02144 70/248 |
| 5,050,411 | A * | 9/1991 | Kawachi | B60R 25/02144 70/201 |
| 5,271,252 | A * | 12/1993 | Yasuhara | B60R 25/02128 70/186 |
| 5,794,469 | A * | 8/1998 | Suzuki | B60R 25/02144 70/186 |
| 6,487,883 | B2 * | 12/2002 | Suzuki | B60R 25/02144 477/99 |
| 6,508,090 | B1 * | 1/2003 | Hasegawa | B60R 25/02 477/99 |
| 6,880,374 | B2 * | 4/2005 | Yukihara | B60R 25/02115 70/1.5 |
| 7,140,213 | B2 * | 11/2006 | Feucht | B60R 25/02153 70/186 |
| 7,302,817 | B2 * | 12/2007 | Ohtaki | B60R 25/04 70/186 |
| 8,943,863 | B2 * | 2/2015 | Town | B60R 25/0215 70/186 |
| 9,267,583 | B2 | 2/2016 | Narovlansky et al. | |
| 2004/0182121 | A1 * | 9/2004 | Fukatsu | B60R 25/02153 70/186 |
| 2005/0268677 | A1 * | 12/2005 | Okada | B60R 25/02153 70/186 |
| 2008/0271504 | A1 * | 11/2008 | Okada | B60R 25/02153 70/252 |
| 2015/0158459 | A1 | 6/2015 | Yoshida et al. | |

FOREIGN PATENT DOCUMENTS

| | | |
|---|---|---|
| JP | S62-139764 U | 9/1987 |
| JP | 2007-055292 A | 3/2007 |
| JP | 2015-512006 A | 4/2015 |
| JP | 2015-112987 A | 6/2015 |

OTHER PUBLICATIONS

Japanese Office Action dated Dec. 12, 2017 issued in Japanese Patent Application No. 2016-005120.

Japanese Office Action dated May 8, 2018 issued in Japanese Patent Application No. 2016-005120.

* cited by examiner

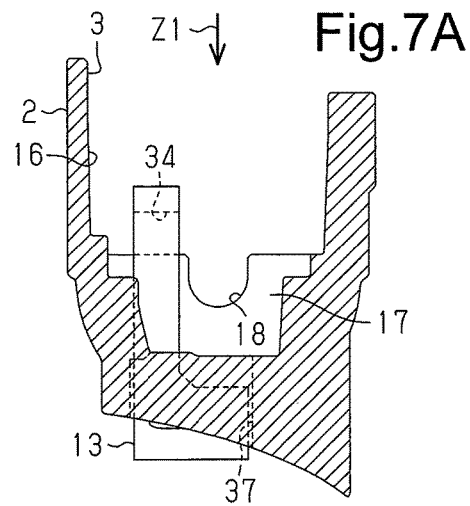
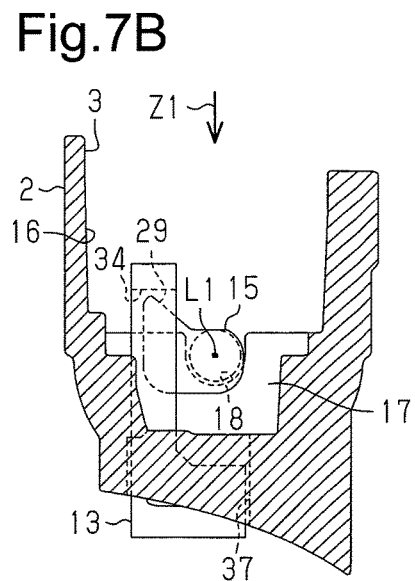
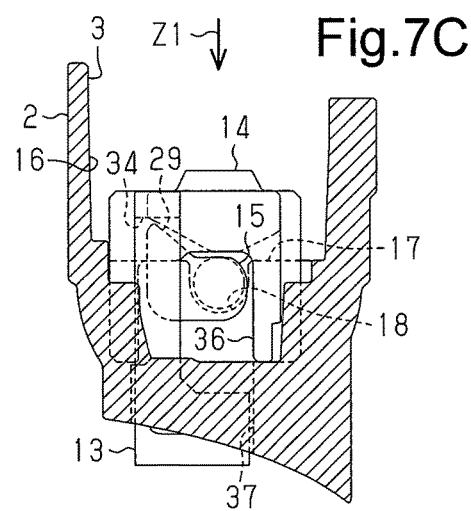
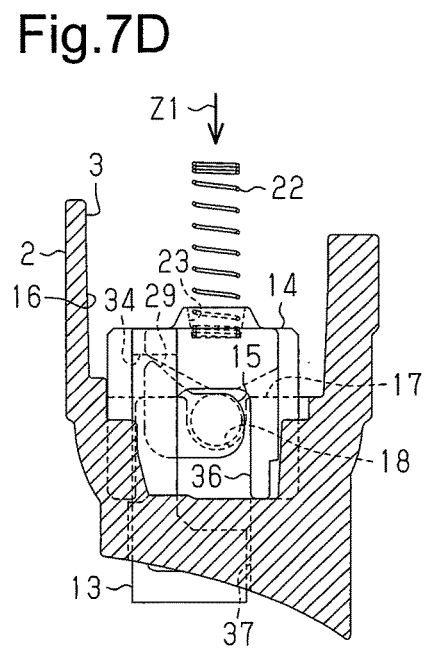
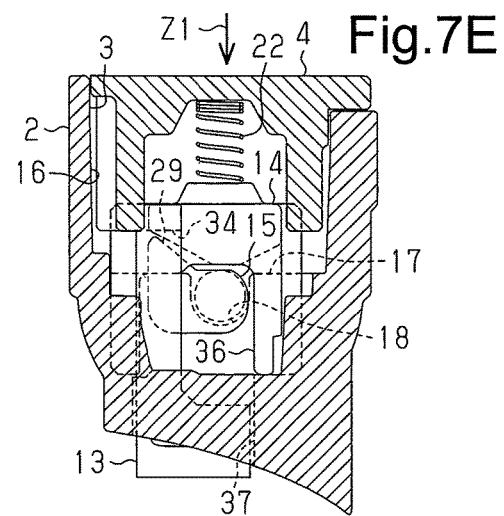

STEERING LOCK DEVICE AND ASSEMBLING METHOD OF STEERING LOCK DEVICE

CROSS-REFERENCE TO RELATED APPLICATIONS

This application is based upon and claims the benefit of priority from prior Japanese Patent Application No. 2016-005120, filed on Jan. 14, 2016, the entire contents of which are incorporated herein by reference.

FIELD

The present invention relates to a steering lock device and a method for assembling a steering lock device.

BACKGROUND

Japanese Laid-Open Patent Publication No. 2007-055292 describes a prior art steering lock device that is mounted on a vehicle. The steering lock device includes a key cylinder and a camshaft, which is rotated when the key cylinder is rotated by a mechanical key, which is, for example, the blade of a key. The rotation of the camshaft moves a lock bar in a locking direction or an unlocking direction to lock or unlock the steering shaft.

SUMMARY

A method for manufacturing a steering lock device includes a step of coupling a camshaft to a key cylinder with the camshaft and the key cylinder positioned at predetermined angles relative to each other. For example, if the camshaft is rotated before the coupling of the camshaft and the key cylinder is completed, the rotation position of the camshaft needs to be set again relative to the key cylinder. Thus, assembling the steering lock device is burdensome.

It is an object of the present invention to provide a steering lock device that is easy to assemble and a method for assembling the steering lock device.

One aspect of the invention is a steering lock device for use with a steering shaft that includes a lock bar, a camshaft, and a counterweight. The lock bar is moved between an engagement position where the lock bar is engaged with the steering shaft and a non-engagement position where the lock bar is disengaged from the steering shaft. The camshaft is rotated in response to a locking operation and an unlocking operation. The camshaft includes a lock actuation cam that moves the lock bar to the engagement position in a locking direction, and rotation of the steering shaft is prohibited when the lock bar is engaged with the steering shaft. The counterweight is arranged on the camshaft to adjust rotational balance of the camshaft.

In this structure, the counterweight arranged on the camshaft balances rotation of the camshaft. Thus, when coupling the camshaft, the camshaft is stably located at an initial angular rotation position. This prevents or limits unintended rotation of the camshaft and facilitates the positioning of the camshaft and the key cylinder when coupling the camshaft. Thus, the steering lock device is easily assembled.

In one example of the steering lock device, the counterweight projects from the camshaft in a radial direction.

This structure is advantageous for adjusting the mass of the counterweight at a high degree of freedom. For example, even when the camshaft includes another heavy portion, the heavy portion is easily balanced by the counterweight.

One example of the steering lock device further includes a housing and a key cylinder coupled to the housing. The housing is configured to allow a key interlock unit to be coupled to the housing. The key interlock unit permits removal of a key blade from the key cylinder only when a shift lever of a vehicle is located at a parking position. The camshaft includes an interlock cam having a cam surface that comes into contact with the key interlock unit and actuates the key interlock unit. The counterweight and the interlock cam are arranged to be symmetrical with respect to a shaft axis of the camshaft. In this structure, the counterweight is arranged proximate to the interlock cam. This facilitates the balancing of the camshaft.

In one example of the steering lock device, the housing includes an interlock coupling portion to which the key interlock unit is coupled, the interlock coupling portion includes an accommodation space that accommodates at least a portion of the key interlock unit, and the counterweight is arranged in the accommodation space. In this structure, the accommodation space in the housing is utilized for the arrangement of the counterweight. Thus, the empty space in the housing is efficiently used when adding the counterweight.

Another aspect of the invention is a method for assembling a steering lock device that is for use with a steering shaft. The method includes coupling a lock bar to a housing of the steering lock device; coupling a camshaft, which includes a lock actuation cam, to the housing in the same direction as the lock bar; coupling a stopper to the housing in the same direction as the lock bar and the camshaft; coupling an urging element, which urges the stopper in a locking direction, to the stopper in the same direction as the lock bar, the camshaft, and the stopper; and coupling a cover, which closes an opening of the housing, to the housing in the same direction as the lock bar, the camshaft, the stopper, and the urging element.

This configuration allows each component of the steering lock device to be coupled to the housing in the same direction. Thus, the steering lock device is easily assembled.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which:

FIGS. 7A to 7E are schematic cross-sectional views showing the assembling of the steering lock device.

DESCRIPTION OF THE EMBODIMENTS

One embodiment of a steering lock device 1 will now be described.

Figure 1:
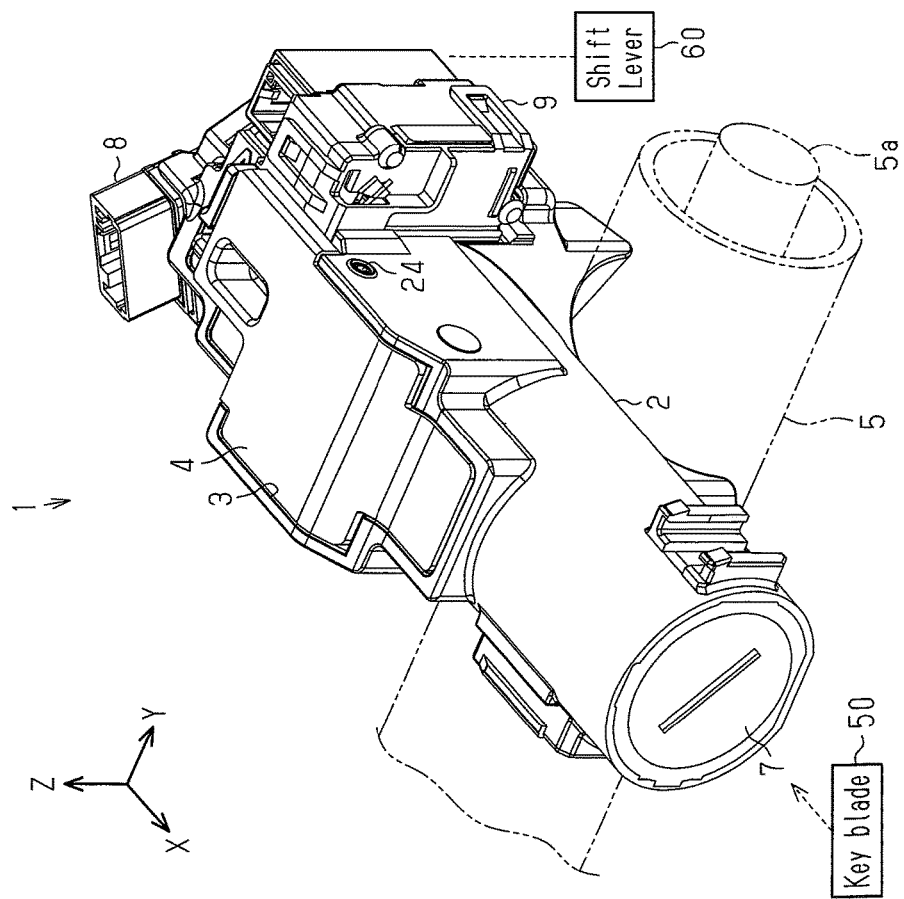
FIG. 1 is a perspective view showing one embodiment of a steering lock device.

As shown in FIG. 1, the steering lock device 1 is for use with, for example, a vehicle and configured to selectively prohibit and permit operation of a steering wheel (not shown). The steering lock device 1 includes a housing 2, which may also be referred to as a lock body, and a cover 4, which closes an opening 3 of the housing 2. The housing 2 is, for example, tubular and is formed from, for example, a magnesium alloy. The material of the cover 4 is, for example, a zinc alloy. The steering lock device 1 is coupled and fixed to a steering column 5, for example, by a bracket (not shown). In the example shown in the drawings, a steering shaft 5a is rotationally accommodated in the steering column 5.

The housing 2 has one end in a longitudinal direction (X-axis direction in FIG. 1) of the steering lock device 1, and a key cylinder 7 is coupled to the longitudinal end and operated by a mechanical key, such as a key blade 50. The housing 2 has a distal end including a key cylinder port 2a. The key cylinder 7 is inserted into the key cylinder port 2a to close the key cylinder port 2a and couple the key cylinder 7 to the housing 2. The housing 2 has a basal end to which an ignition switch 8 is coupled. The ignition switch 8 switches power states (vehicle power states) in accordance with an operation position of the key cylinder 7. A key interlock unit 9 is coupled to one side of the housing 2. The key interlock unit 9 permits removal of the key blade 50 from the key cylinder 7 only when a shift lever 60 of a vehicle is located at a parking position.

Figure 3:
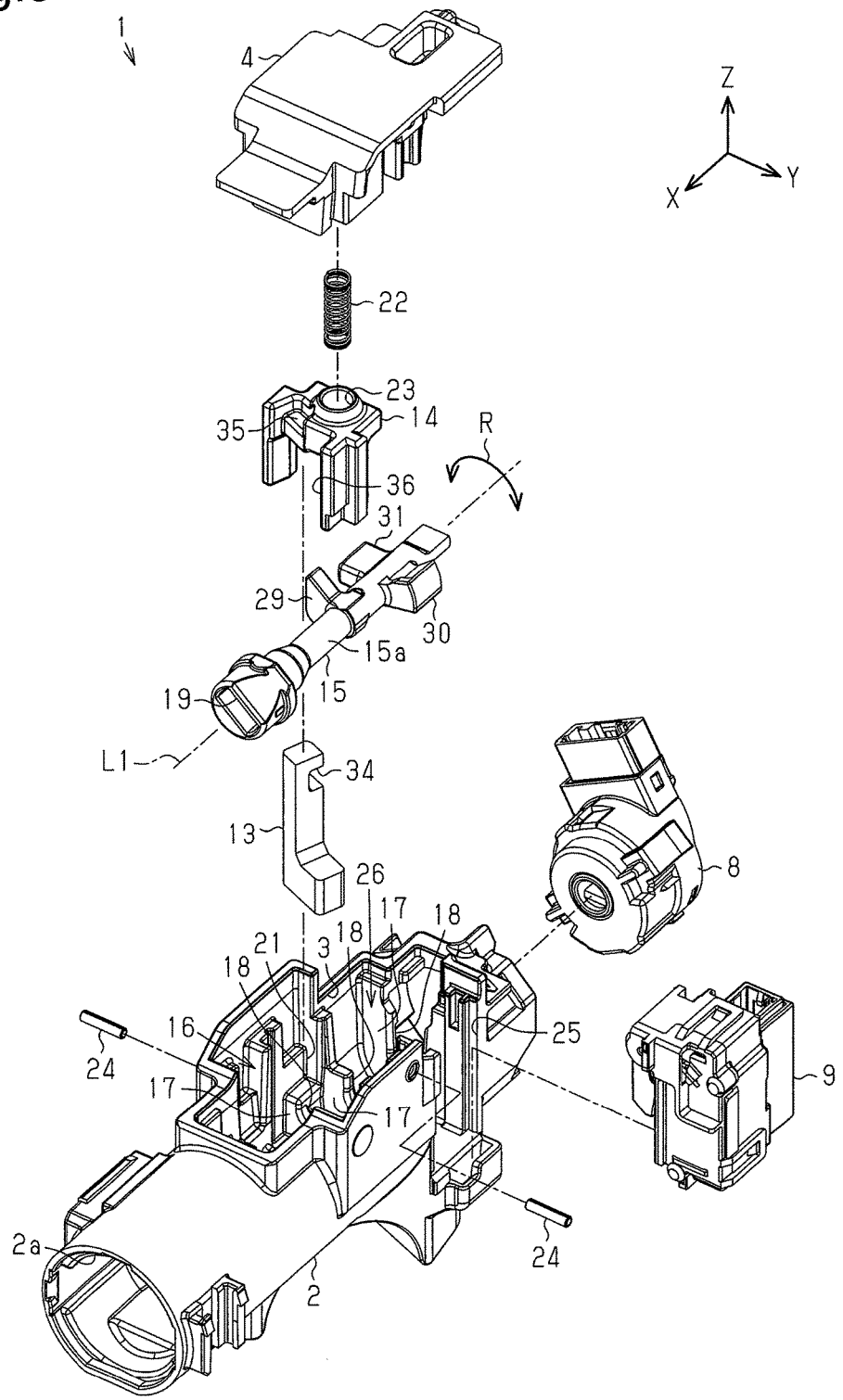
FIG. 3 is an exploded perspective view of the steering lock device.

As shown in FIG. 3, the steering lock device 1 includes a lock bar 13, which is capable of engaging the steering shaft 5a, a stopper 14, which is coupled to the lock bar 13, and a camshaft 15, which is rotated when the key cylinder 7 is operated with the key blade 50. As indicated by two-direction arrows R in FIG. 3, the camshaft 15 is rotational about an axis L1 of the camshaft 15 in the clockwise direction and the counterclockwise direction. The housing 2 includes a component receptacle 16. The component receptacle 16 accommodates the lock bar 13, the stopper 14, and the camshaft 15. The component receptacle 16 includes shaft seats 17, which may be a plurality of (e.g., three) walls spaced apart from one another in a longitudinal direction of the housing 2. Each shaft seat 17 includes an arcuate slot 18. The camshaft 15 is rotationally mounted on the shaft seats 17 (slots 18). The camshaft 15 has one end that includes an elongated receptacle 19, to which the key cylinder 7 is coupled.

The stopper 14 is coupled to the housing 2 in a manner that is linearly and reciprocally movable along two guides 21 (only one shown in FIG. 3), which are formed in inner wall surfaces of the housing 2. The stopper 14 may directly contact the lock bar 13 to adjust or vary the projecting length of the lock bar 13 from the housing 2 toward the steering shaft 5a (see FIGS. 6A and 6B). The stopper 14 may be referred to as a movable stopper. An urging element 22 is located between the cover 4 and the stopper 14 to urge the stopper 14 in the locking direction (lower direction in FIG. 3). The urging element 22 may be a coil spring, which may also be referred to as a lock spring. The urging element 22 has one end that is accommodated in a hole 23 located in an upper surface of the stopper 14. The urging element 22 has another end that is supported by an inner surface of the cover 4. The cover 4 is coupled to the housing 2 by press-fitting pins 24. The urging element 22 is compressed between the cover 4 and the stopper 14.

The housing 2 includes an interlock coupling portion 25, to which the key interlock unit 9 is coupled. The interlock coupling portion 25 includes an accommodation space 26, which accommodates at least a portion of the key interlock unit 9. The accommodation space 26 is part of the component receptacle 16.

Figure 2A:
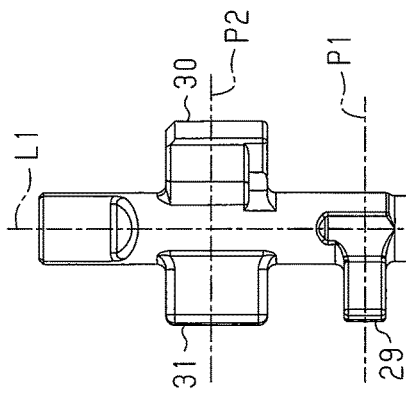
FIG. 2A is a plan view of a camshaft.
Figure 2B:
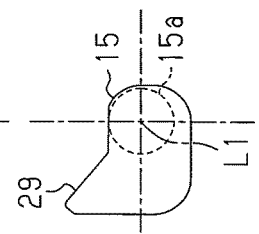
FIG. 2B is a diagram showing a cam surface of a lock actuation cam arranged on the camshaft.

As shown in FIGS. 2A, 2B, and 3, the camshaft 15 includes a lock actuation cam 29 having a cam surface, which comes into contact with the stopper 14 to move the stopper 14 in the locking direction or the unlocking direction. The camshaft 15 includes a cylindrical portion 15a, from which the lock actuation cam 29 projects in a radial direction. When the stopper 14 and the camshaft 15 are coupled to the housing 2, the lock actuation cam 29 is in contact with the stopper 14.

The camshaft 15 includes an interlock cam 30 having a cam surface, which comes into contact with the key interlock unit 9 to actuate the key interlock unit 9. The lock actuation cam 29 and the interlock cam 30 are separated from each other in the axial direction. The lock actuation cam 29 and the interlock cam 30 are located at opposite sides of the camshaft 15 with respect to the shaft axis L1. In the example shown in the drawings, the lock actuation cam 29 is located at a first axial position P1 of the camshaft 15. The interlock cam 30 is located at a second axial position P2 of the camshaft 15. The first axial position P1 and the second axial position P2 are different positions in the axial direction.

The camshaft 15 includes a counterweight 31, which adjusts the rotational balance of the camshaft 15. The counterweight 31 projects from the camshaft 15 (cylindrical portion 15a) in a radial direction. The counterweight 31 is located at a side opposite to the side of the interlock cam 30. The counterweight 31 is arranged in the accommodation space 26, which is located in the interlock coupling portion 25 of the housing 2. The position and the shape of the counterweight 31 are changed in accordance with weights, shapes, and positions of the lock actuation cam 29 and the interlock cam 30 of the camshaft 15.

Figure 4:
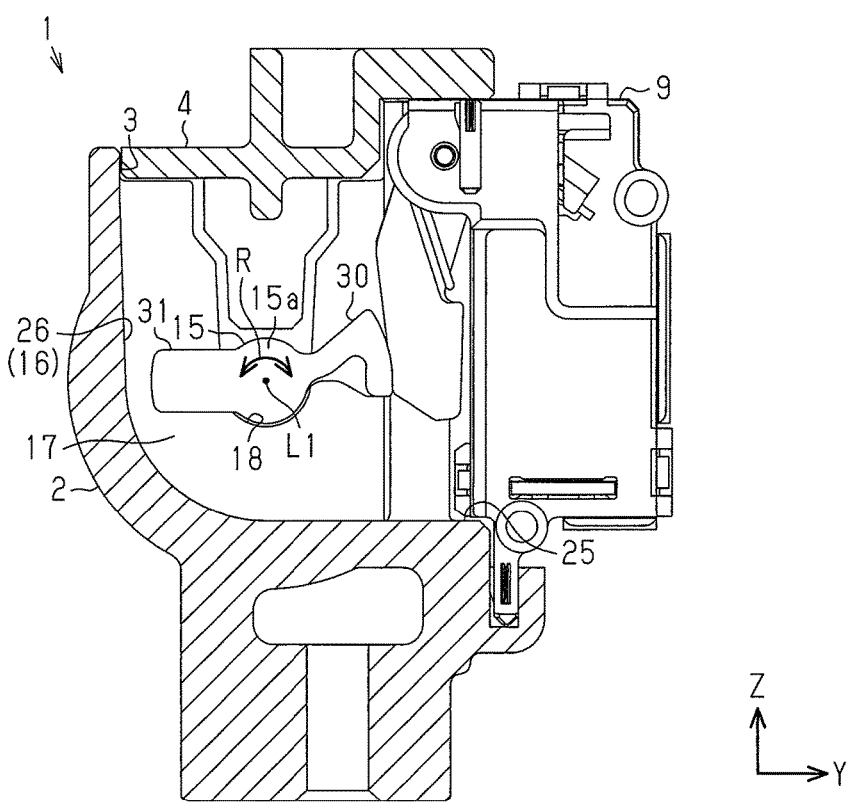
FIG. 4 is a cross-sectional view of the steering lock device including a counterweight.

As shown in FIG. 4, the key interlock unit 9 and the interlock cam 30 are located next to each other in the interlock coupling portion 25 (accommodation space 26) in a width-wise direction (Y-axis direction in FIG. 4) of the steering lock device 1. As shown in FIG. 2, the counterweight 31 and the interlock cam 30 are arranged to be symmetrical with respect to the shaft axis L1 of the camshaft 15.

Figure 5:
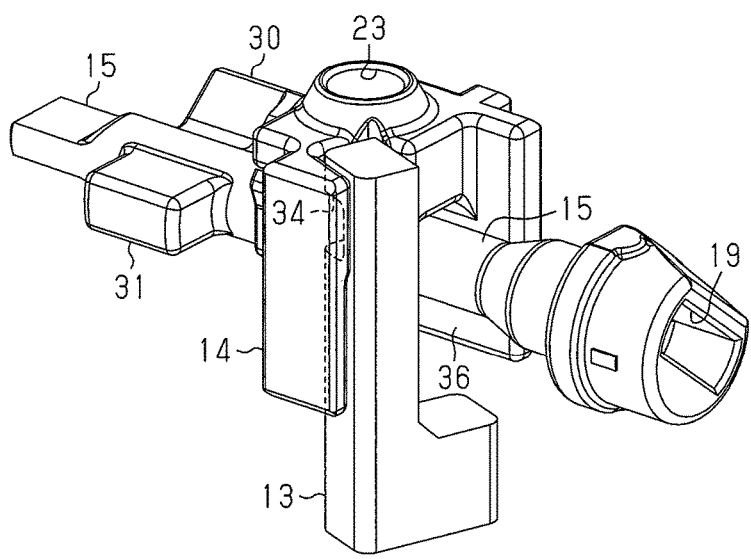
FIG. 5 is a perspective view of a lock bar, the camshaft, and a stopper.

As shown in FIG. 5, the lock bar 13 has a basal end including a recess 34. The stopper 14 includes an engagement portion 35 (refer to FIG. 3). When the recess 34 engages the engagement portion 35, the lock bar 13 is coupled to the stopper 14. Thus, the lock bar 13 and the stopper 14 are moved integrally with each other in the locking direction and the unlocking direction. The stopper 14 has a lower portion including a cutaway portion 36. The camshaft 15 is located in the cutaway portion 36 in a state in which the camshaft 15 is coupled to the housing 2.

Figure 6A:
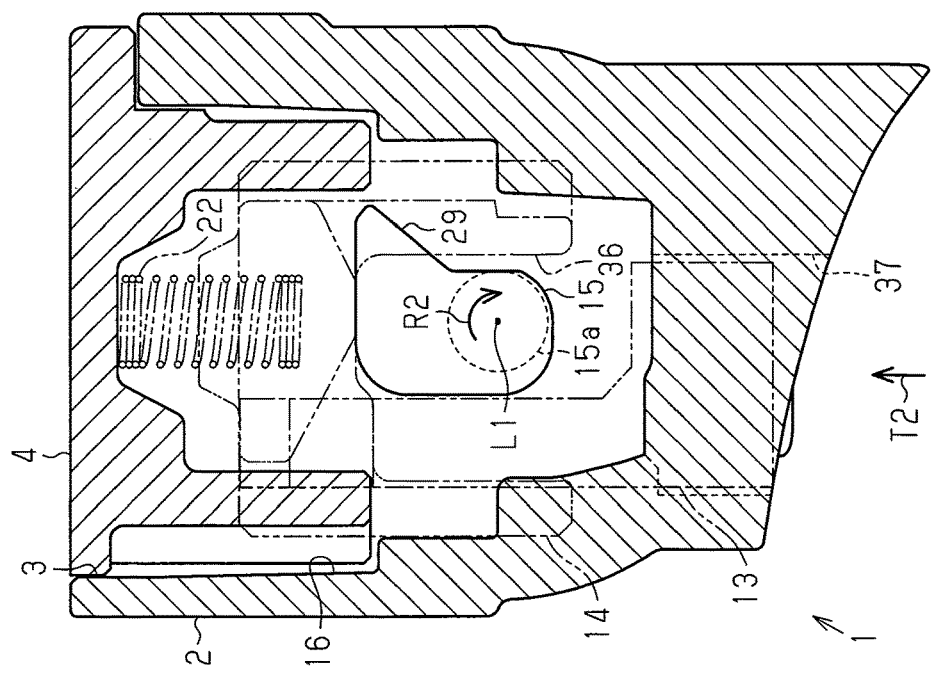
FIG. 6A is a diagram showing a locked state.

As shown in FIG. 6A, for example, when the key cylinder 7 is moved to an ignition off position, the camshaft 15 is rotated in the locking direction (direction indicated by arrow R1 in FIG. 6A) and the lock bar 13 and the stopper 14 are moved in a locking direction (direction indicated by arrow T1 in FIG. 6A) by urging force of the urging element 22. Consequently, the lock bar 13 extends out of a hole 37 of the housing 2 and engages the steering shaft 5a. This locks the steering lock device 1.

Figure 6B:
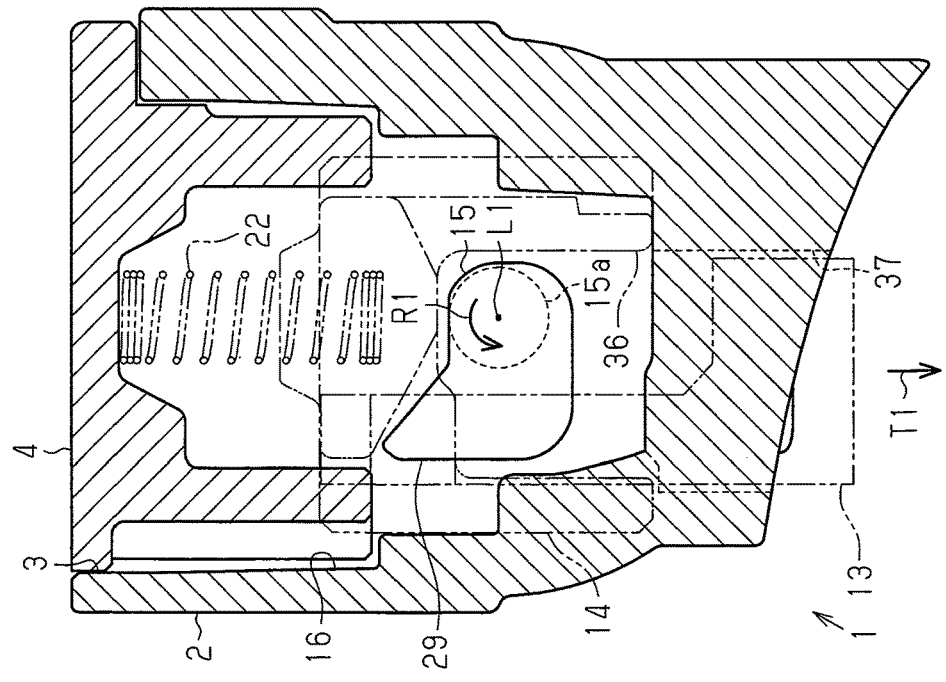
FIG. 6B is a diagram showing an unlocked state.

As shown in FIG. 6B, for example, when the key cylinder 7 is moved to an ACC on position or an ignition on position, the camshaft 15 is rotated in the unlocking direction (direction indicated by arrow R2 in FIG. 6B) and the lock bar 13 and the stopper 14 are lifted by the lock actuation cam 29 of the camshaft 15 in an unlocking direction (direction indicated by arrow T2 in FIG. 6B) against the urging force of the urging element 22. Consequently, the lock bar 13 is separated from the steering shaft 5a and retracted into the housing 2. This unlocks the steering lock device 1.

The operation of the steering lock device 1 will now be described.

As shown in FIG. 4, in the steering lock device 1 that selectively prohibits and permits operation of the steering wheel by moving the lock bar 13 in the locking direction with use of the camshaft 15 (the lock actuation cam 29), the camshaft 15 includes the counterweight 31. Since the counterweight 31 balances the rotation of the camshaft 15, the camshaft 15 is stably located at the initial angular rotation position when coupling the camshaft 15. This prevents or limits unintended rotation of the camshaft 15 when coupling the camshaft 15. Thus, the camshaft 15 and the key cylinder 7 are easily positioned.

The counterweight 31 projects from the camshaft 15 in a radial direction. The counterweight 31, which is a projection, is advantageous for adjusting the mass of the counterweight 31 at a high degree of freedom. For example, even when the interlock cam 30 is relatively heavy or large, the counterweight 31 easily balances the interlock cam 30.

The counterweight 31 and the interlock cam 30 are arranged to be symmetrical with respect to the shaft axis L1 of the camshaft 15. For example, the interlock cam 30 projects from the second axial position P2 of the camshaft 15 in the radial direction of the camshaft 15, which is rightward in FIG. 2. The counterweight 31 radially projects from the second axial position P2 of the camshaft 15 in a direction opposite to the direction of the interlock cam 30, which is leftward in FIG. 2. The counterweight 31 is arranged proximate to the interlock cam 30. This is advantageous for facilitating the balancing of the rotation of the camshaft 15.

The housing 2 includes the accommodation space 26, which accommodates at least a portion of the key interlock unit 9. When the camshaft 15 includes the counterweight 31, the counterweight 31 is arranged in the accommodation space 26. This utilizes the empty space of the accommodation space 26 when arranging the counterweight 31. Thus, the empty space in the housing 2 is efficiently used when adding the counterweight 31.

Assembling of the steering lock device 1 will now be described with reference to FIGS. 7A to 7E. FIGS. 7A to 7E show cross-sections of the housing 2 including the opening 3. The lock bar 13, the stopper 14, and the camshaft 15 are inserted into the housing 2 through the opening 3, which differs from the key cylinder port 2a.

As shown in FIG. 7A, for example, the lock bar 13 is coupled to the housing 2 of the steering lock device 1 (first step). For example, the lock bar 13 is coupled to the housing 2 in a downward direction (direction of arrow Z1 in FIG. 7A). It is desirable that the lock bar 13 be supported, for example, by a hand so that the lock bar 13 will not fall from the hole 37 of the housing 2.

As shown in FIG. 7B, after the lock bar 13 is coupled, the camshaft 15 is coupled to the housing 2 in the same direction as the lock bar 13 (second step). For example, when the rotation position of the camshaft 15 about the shaft axis L1 conforms to the ignition off position of the key cylinder 7, the camshaft 15 is coupled to the housing 2 in a downward direction (direction of arrow Z1 in FIG. 7B). The camshaft 15 is, for example, mounted on the shaft seats 17 in the housing 2 when coupled. For example, since the camshaft 15 includes the counterweight 31, the camshaft 15 is balanced in the direction extending along the shaft axis L1. Thus, when the camshaft 15 is coupled to the housing 2, unintentional rotation of the camshaft 15 in the direction extending along the shaft axis L1 is restricted. This ensures easiness of the coupling.

As shown in FIG. 7C, after the camshaft 15 is coupled, the stopper 14 is coupled to the housing 2 in the same direction as the lock bar 13 and the camshaft 15 (third step). At this time, the stopper 14 engages the lock bar 13 when coupled. For example, the stopper 14 is also coupled to the housing 2 in a downward direction (direction of arrow Z1 in FIG. 7C).

As shown in FIG. 7D, after the stopper 14 is coupled, the urging element 22, which urges the stopper 14 (the lock bar 13) in the locking direction, is coupled to the stopper 14 in the same direction as the lock bar 13, the camshaft 15, and the stopper 14 (fourth step). For example, the urging element 22 is inserted into the hole 23 of the stopper 14 in a downward direction (direction of arrow Z1 in FIG. 7D) and coupled to the housing 2.

As shown in FIG. 7E, after the urging element 22 is coupled, the cover 4 is coupled to the housing 2 in the same direction as the lock bar 13, the camshaft 15, the stopper 14, and the urging element 22 to close the opening 3 of the housing 2 with the cover 4 (fifth step). For example, the cover 4 is aligned with the housing 2 in a downward direction (direction of arrow Z1 in FIG. 7E), and the cover 4 is coupled to the housing 2 by the press-fitting pins 24. The above steps complete the assembling of the steering lock device.

The lock bar 13, the camshaft 15, the stopper 14, the urging element 22, and the cover 4 are sequentially coupled to the housing 2 in the same direction (refer to arrows Z1 in FIGS. 7A to 7E). This facilitates the assembling of the steering lock device 1. The counterweight 31 of the camshaft 15 prevents the camshaft 15, which is coupled to the housing 2, from rotating about the shaft axis L1. Thus, the steering lock device 1 is easily assembled.

The embodiment may be modified as follows.

It is preferred that the camshaft 15 include a single counterweight 31. However, the camshaft 15 may include a plurality of counterweights. In one example, a camshaft may include a subset of divided counterweight pieces at the position of the counterweight 31 of the embodiment.

The shape of the counterweight 31 may be changed.

The counterweight 31 may be located at a position that differs from the side opposite to the interlock cam 30.

The counterweight 31 may be located at a position that differs from the accommodation space 26.

It is preferred that the counterweight 31 and the camshaft 15 be a single piece member. However, the counterweight 31 and the camshaft 15 may be discrete members. In this case, the counterweight 31 and the camshaft 15 are manufactured separately, and thereafter the counterweight 31 is fixed to the camshaft 15.

The mass of the counterweight 31 is determined to stabilize the camshaft 15 at the initial angular rotation position.

When the stopper 14 is omitted, the camshaft 15 may be configured to directly move the lock bar 13.

The stopper 14 and the lock bar 13 may be integrally formed as a one-piece member.

The opening 3 of the housing 2 only needs to be large enough to allow for insertion of the camshaft 15.

It is preferred that the opening 3 be located in the upper surface of the housing 2. However, the opening 3 may be located at a position other than the upper surface such as a side surface of the housing 2.

It is preferred that each component of the steering lock device 1 be coupled in the downward direction shown in FIG. 3. However, the direction may be changed as long as the elements are coupled in the same direction.

The interlock cam 30 may be omitted.

The steering lock device 1 may be of a mechanical-driven type or an electrical-driven type.

It should be apparent to those skilled in the art that the present invention may be embodied in many other specific forms without departing from the scope of the invention. For example, one or more of the components may be omitted from the components described in the embodiments (or one or more aspects thereof). Further, components in different embodiments may be appropriately combined.

The present examples and embodiments are to be considered as illustrative and not restrictive, and the invention is not to be limited to the details given herein, but may be modified within the scope and equivalence of the appended claims.

The invention claimed is:

1. A steering lock device comprising:
   a housing;
   a lock bar accommodated in the housing and capable of engaging a steering shaft, wherein the lock bar is moved between an engagement position where the lock bar is engaged with the steering shaft and a non-engagement position where the lock bar is disengaged from the steering shaft;
   a camshaft accommodated in the housing and rotatable in response to a locking operation and an unlocking operation, wherein the camshaft includes a lock actuation cam that allows for the lock bar to be moved to the engagement position in a locking direction, and rotation of the steering shaft is prohibited when the lock bar is engaged with the steering shaft;
   a key cylinder coupled to the housing, wherein the key cylinder includes a hole into which a key blade is insertable;
   a key interlock unit coupled to the housing, wherein the key interlock unit permits removal of the key blade from the key cylinder only when a shift lever of a vehicle is located at a parking position;
   an interlock cam arranged on the camshaft and having a cam surface that comes into contact with the key interlock unit and actuates the key interlock unit; and
   a counterweight arranged on the camshaft, wherein the counterweight has a mass that adjusts rotational balance of the camshaft,
   wherein the counterweight and the interlock cam project radially from the camshaft in opposite directions to each other with respect to a shaft axis of the camshaft.

2. The steering lock device according to claim 1, wherein
   the housing includes an interlock coupling portion to which the key interlock unit is coupled,
   the interlock coupling portion includes an accommodation space that accommodates at least a portion of the key interlock unit, and
   the counterweight is arranged in the accommodation space.

3. The steering lock device according to claim 1, wherein
   the lock actuation cam is located at a first axial position of the camshaft, and
   the counterweight is located at a second axial position of the camshaft that differs from the first axial position.

4. The steering lock device according to claim 3, wherein
   the lock actuation cam projects from the first axial position of the camshaft in a radial direction of the camshaft,
   the counterweight projects from the second axial position of the camshaft in the radial direction of the camshaft, and
   the lock actuation cam and the counterweight project radially in the same direction from the camshaft.

* * * * *